United States Patent [19]

Wallace

[11] 4,179,021

[45] Dec. 18, 1979

[54] LIFT DEVICE ARRANGEMENT

[75] Inventor: Charles H. Wallace, Carrollton, Va.

[73] Assignee: International Telephone and Telegraph Corporation, Nutley, N.J.

[21] Appl. No.: 889,713

[22] Filed: Mar. 24, 1978

[51] Int. Cl.² .......................................... B65G 42/00
[52] U.S. Cl. ................................. 198/341; 198/346
[58] Field of Search ................. 198/340, 341, 346; 182/148

[56] References Cited

U.S. PATENT DOCUMENTS

| | | | |
|---|---|---|---|
| 3,168,937 | 2/1965 | Redford et al. | 182/148 |
| 3,737,949 | 6/1973 | Davis | 17/21 |
| 3,928,114 | 12/1975 | Aylon | 198/341 |
| 3,940,998 | 3/1976 | Sourby et al. | 17/52 |

*Primary Examiner*—Jeffrey V. Nase
*Attorney, Agent, or Firm*—John T. O'Halloran; Alfred C. Hill

[57] ABSTRACT

This arrangement is employed to measure the back fat thickness at three selected locations on an animal carcass conveyed on an overhead conveyor. The arrangement includes a hydraulically operated lift device to raise and lower a single operator to enable the operator to make measurements of the back fat thickness at the first rib, the last rib and the last lumbar of the carcasses. A circuit is coupled to the lift device and synchronized to the movement of the conveyor to automatically control the movement of the lift device and to provide automatically an indication of the position of the lift device at which the operator is making each of the measurements.

9 Claims, 5 Drawing Figures

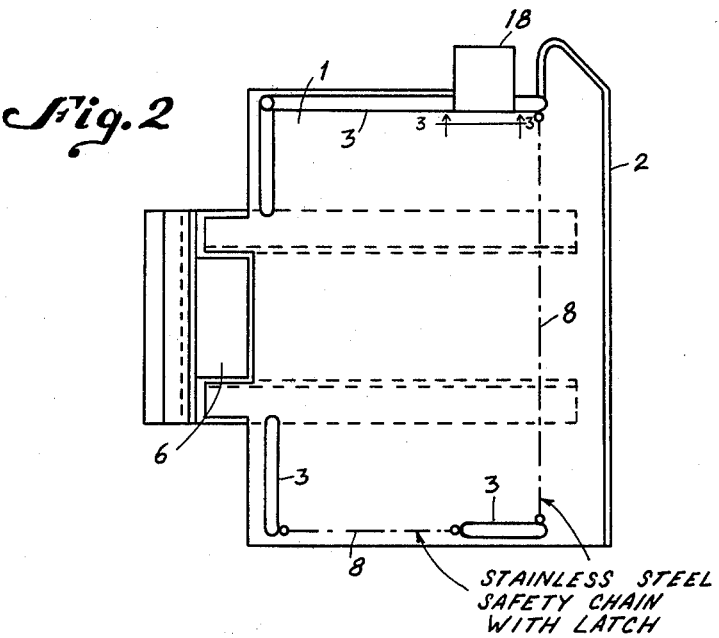
Fig. 2
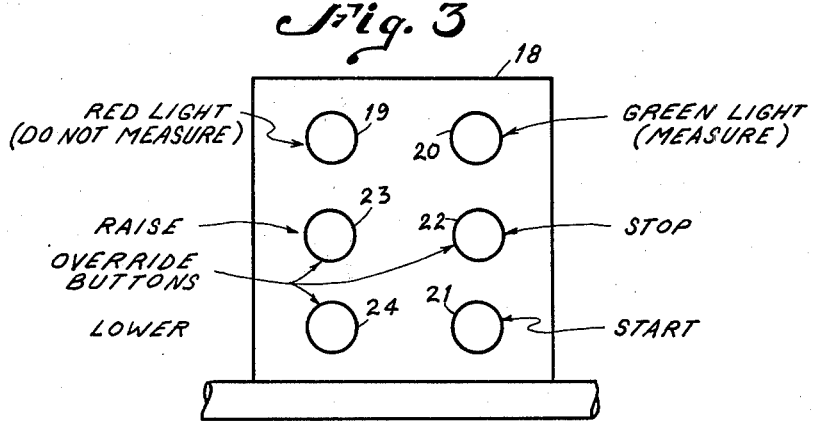
Fig. 3
Fig. 4
(a) R = RELAY, R1 = RELAY NUMBER 1
(b) ─┤├─ = NORMALLY OPEN CONTACTS OF A DOUBLE POLE - SINGLE THROW RELAY
─┤├─$^{C1R1}$ = NORMAL OPEN CONTACT 1 OF RELAY 1
(c) ─┤⊁├─ = NORMALLY CLOSED CONTACTS OF A DOUBLE POLE - SINGLE THROW RELAY
─┤⊁├─$^{C2R1}$ = NORMALLY CLOSED CONTACT 2 OF RELAY 1
(d) ─⋀─ = COIL OF RELAY (SOLENOID)

LIFT DEVICE ARRANGEMENT

BACKGROUND OF THE INVENTION

This invention relates to animal slaughtering processing plants and more particularly to an arrangement to measure the back fat thickness at the first rib, the last rib, and the last lumbar of animal carcasses conveyed on an overhead conveyor.

Hog slaughtering plants which optimizes the value of the resulting cuts made from each carcass under existing market conditions as well as providing management with a tool by which each animal or hog can be evaluated in terms of profit or loss based on the total operation from purchase of the animal to sale of the resulting products is disclosed in U.S. Pat. No. 3,940,998, whose disclosure is incorporated herein by reference. The process described in this patent includes making physical measurements of the ham circumference, body length, back fat depth and a subjective evaluation of muscle quality. These are utilized to provide data to a computer which in accordance with the algorithm set forth in the above-cited patent, predicts the weight or range of weights of the ham/loin cuts which can be produced and issues instructions as to the point with respect to the aitch bone for the butcher to cut each individual hog carcass to optimize the value under existing market price conditions of the resulting ham/loin cut.

Measuring of back fat thickness on hog carcasses on a production line has in the past been performed from a stationary platform requiring more than one person as the three measurements required must be made at the first rib, the last rib and the last lumbar of the animal or hog carcass.

SUMMARY OF THE INVENTION

An object of the present invention is to provide an arrangement to enable a single operator to measure the back fat thickness at the first rib, the last rib and the last lumbar on animal carcasses conveyed on an overhead conveyor.

A feature of the present invention is the provision of an arrangement to measure the back fat thickness at three selected locations on animal carcasses conveyed on an overhead conveyor comprising: a hydraulically operated lift means to raise and lower a single operator to enable the operator to make measurements of the back fat thickness at the selected locations; and circuit means coupled to the lift means and synchronized to the movement of the conveyor to automatically control the movement of the lift means and to provide automatically an indication of the position of the lift means at which the operator is making each of the measurements.

The use of a lift device with an up and down travel of two feet enables one operator to reach the three locations to obtain the required measurements. Since one tool is used to make all three measurements and transmit an electronic signal through an interface into a computer, it is extremely confusing to the operator to remember which position he is in and to activate the correct signal switch for that location. The operator is required to make 3 measurements per hog times 400 hogs hourly or 1200 measurements per hour or 20 per minute.

Hence, instead of three switches, there is only one control switch. In accordance with the present invention by placement of four cam operated switches for the three measurements and combining the single tool switch and the cam operated switches, there is provided the necessary information to the interface for proper data feed to the computer. Without this arrangement, more than 50% of the data was erroneous as an operator could not remember which of the switches to push as he was not certain whether he was at low level, mid level or upper level of the lift device since the operator must have his eyes fixed upon the exact location on the hog to make measurements and cannot accurately select correct control switches to activate at speeds involved. Without the man lift, two persons would be required at speeds of 300 to 400 hogs hourly.

BRIEF DESCRIPTION OF THE DRAWING

Above-mentioned and other features and objects of this invention will become more apparent by reference to the following description taken in conjunction with the accompanying drawing, in which:

FIG. 2 is a top view of FIG. 1;

FIG. 3 is a front view taken along line 3—3 of FIG. 2 of the control panel on the man lift device;

FIG. 4 illustrates the symbols employed in the electric circuit of FIG. 5; and

DESCRIPTION OF THE PREFERRED EMBODIMENT

Figure 1:
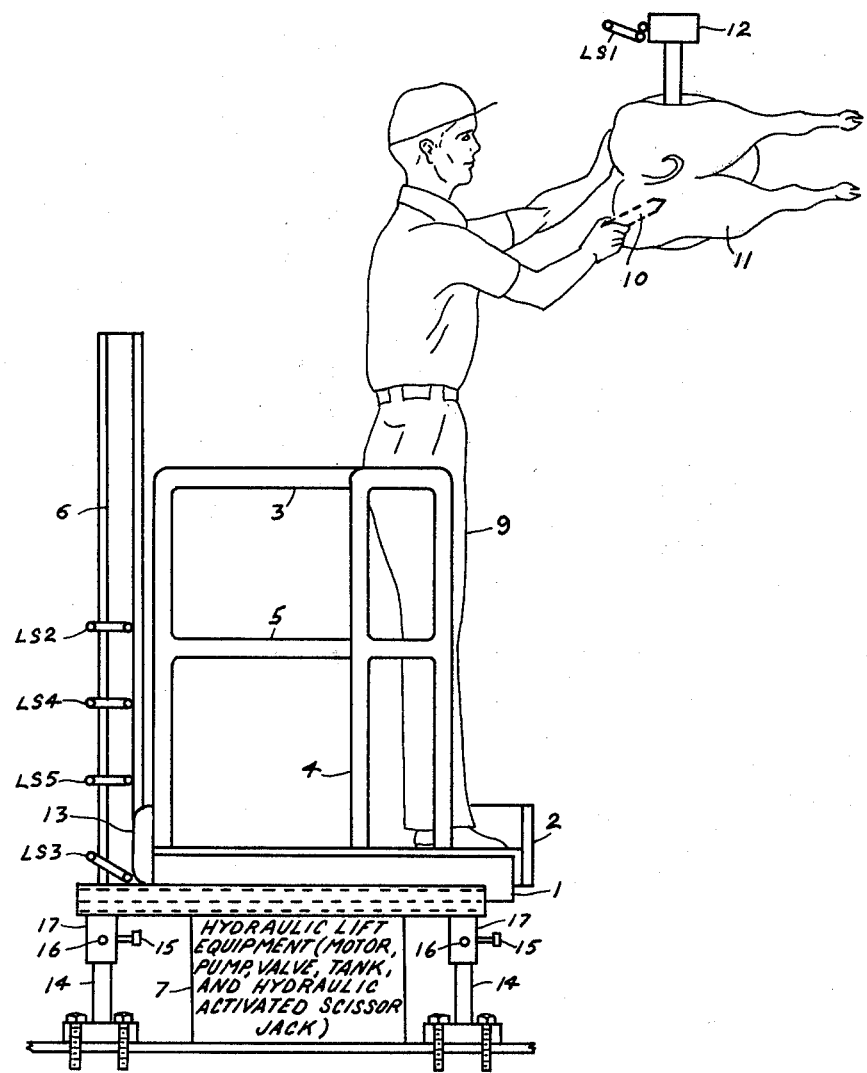
FIG. 1 is a side view of the man lift device in accordance with the principles of the present invention.

Referring to FIGS. 1 and 2, the lift device includes a platform 1 having thereon a toe plate 2 to prevent the operator from sliding off the platform and railings 3, 4 and 5 also providing safety for the operator. The lift device platform 1 rides on a column 6 when it is hydraulically operated by the hydraulic lift equipment 7 which includes a motor, a pump, a valve, a storage tank, and hydraulically actuated scissor jacks. As illustrated in FIG. 2, the railings 3, 4 and 5 do not completely enclose the operator but rather to enable the operator to make unobstructed measurements, there is provided two stainless steel safety chains 8 with latches. Not only do these safety chains 8 provide safety for the operator, but they also provide the operator means to enter the lift device and leave the man lift.

The operator 9 uses a single back fat measuring tool 10 to make the measurements at the first rib, last rib and the last lumbar of carcass 11 conveyed on an overhead conveyor 12.

The platform 1 includes a cam surface 13 which actuates switches LS2, LS3, LS4 and LS5 which will be described in greater detail with respect to the electric circuit shown in FIG. 5.

The platform 1 is provided with adjustable legs 14 which are used to set up the lift device by the use of set screws 15 to assist in leveling the lift device. Once the lift device is in the desired leveled position, bolts 16 are employed to permanently hold the sleeves 17 of legs 14 in the proper position permanently.

A sync switch LS1 is suitably mounted so as to be tripped by the carcass conveyor 12, each time the conveyor advances a distance equal to the spacing between the carcasses on the conveyor 12 (typically two to four feet).

Referring to FIG. 3, there is illustrated therein the front of a control arrangement 18 which has disposed thereon a red light 19 which turns on during the transition between the upper and mid ranges and the mid and lower ranges. Each measurement must be completed before this light comes on. A green light 20 turns on when the lift device is in the proper position for measurement. A start button 21 starts the hydraulic equipment pump motor from which point the circuitry of FIG. 5 will automatically control the movement of the lift device. There are also provided three override buttons for use by the operator; namely, the stop button 22, a raise button 23 and a lower button 24. The stop button 22 stops the hydraulic pump motor. The raise button 23 causes the lift device to rise, when held in, until the top limit switch is tripped. The lower override button 24 causes the lift device to fall, when held in, until the bottom limit switch is tripped.

Figure 5:
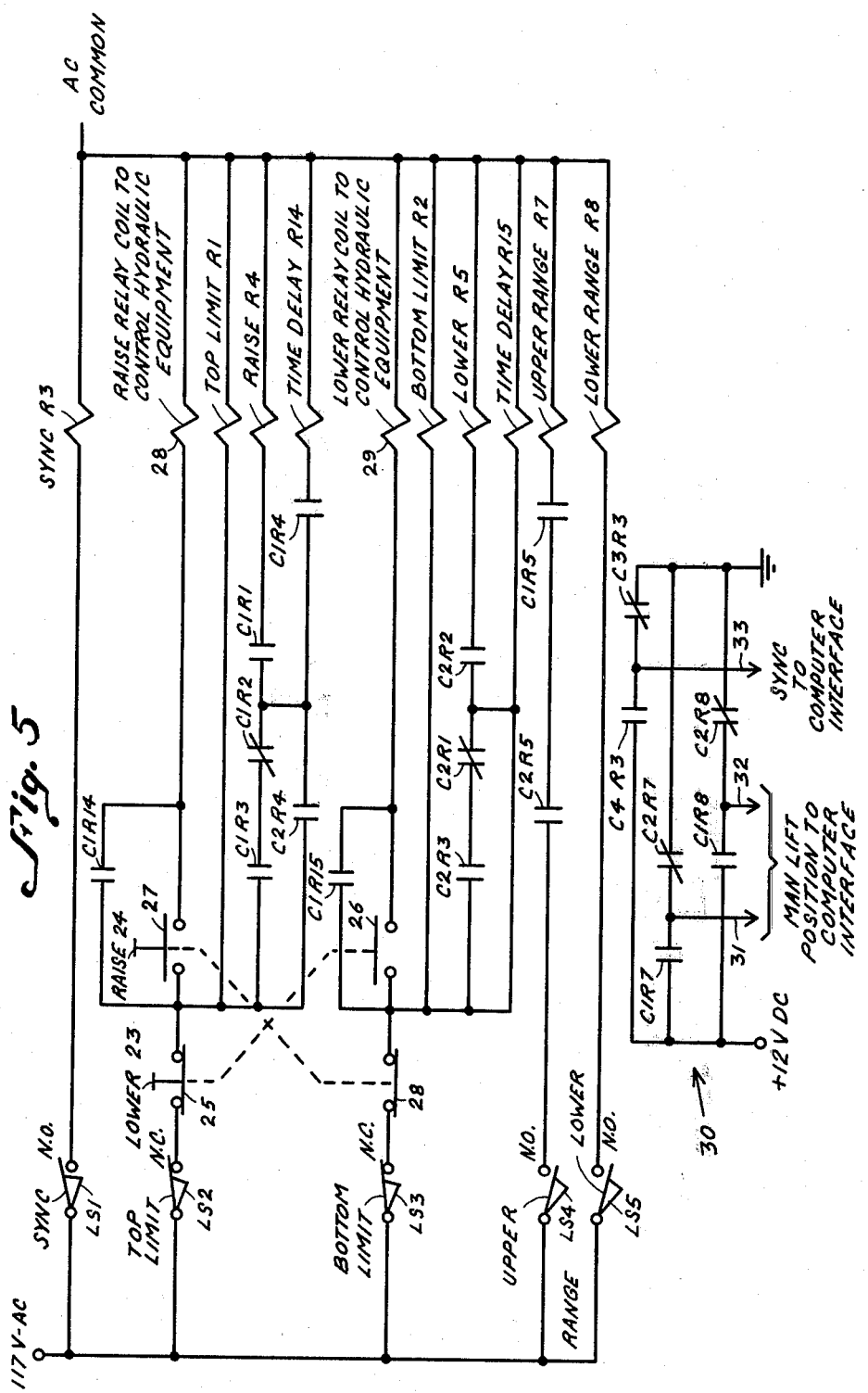
FIG. 5 is the electric circuit that automatically controls the operation of the lift device and automatically provides an indication of the lift device position for coupling to the interface and hence to the computer in accordance with the principles of the present invention.

Referring to FIG. 5, there is illustrated therein the circuitry which automatically controls the raising and lowering of the lift device and automatically provides an indication of the position of the lift device. This circuit includes an input for 117 volts A.C. and an A.C. common or A.C. reference potential. In addition, the circuitry includes the normally open sync switch LS1, a normally closed top limit switch LS2, a normally closed bottom limit switch LS3, a normally open upper range switch LS4 and a normally open lower range switch LS5. It is the condition of the switches LS4 and LS5 that provide an indication to the computer through the interface of the lift device position which will be described in greater detail below. The lower button 23 has a normally closed contact 25 and a normally open contact 26 mechanically interconnected. The raise button 24 has a normally open contact 27 and a normally closed contact 28 which are also mechanically interconnected. The circuit of FIG. 5 also includes a sync relay coil R3, a raise relay coil 28 to control the hydraulic equipment 7 of FIG. 1, a top limit relay coil R1, a raise relay coil R4, a time delay relay coil R14, a lower relay coil 29 to control the hydraulic equipment 7 of FIG. 1, a bottom limit relay coil R2, a lower relay coil R5, a time delay relay coil R15, an upper range relay coil R7 and a lower range relay coil R8. Each of these relay coils have associated therewith at least one relay contact which may be normally open or normally closed as indicated in the circuitry of FIG. 5. The raise relay coil 28 and the lower relay coil 29 have their associated contacts disposed in the hydraulic lift equipment 7 so as to start and stop the motor of the hydraulic lift equipment.

The cycle of operation is as follows: With the lift device at floor level, the operator 9 of FIG. 1 measures back fat thickness at the first rib and activates the switch of tool 10. Due to the down position of the lift device the circuit of FIG. 5 will identify the measurement as the first rib. The lift device then automatically travels upward twelve inches and the operator takes the measurement of the thickness of the back fat at the last rib and activates the switch of tool 10. Due to the position of the lift device this measurement is interfaced into the computer as the back fat measurement at the last rib. The lift device then travels upward twelve more inches and the operator measures the back fat thickness at the last lumbar. While the operator was taking these measurements, the hog carcass has travelled approximately four feet and the second hog is in position. The operator who is in the up position will measure the back fat thickness at the last lumbar of the second hog and activate the single switch of tool 10. The lift device lowers twelve inches and the operator measures the back fat thickness at the last rib. The lift device then lowers twelve more inches and the operator measures the first back fat thickness at the first rib. Each signal as provided by the circuitry of FIG. 5 identifies the location of the measurement being made on each respective hog. The operator can work with speeds of 500 hogs hourly.

The operation of the circuit of FIG. 5 is as follows. With the lift device in the lower position, the top limit switch LS2 is closed and the 117 volt A.C. is applied through switch LS2 to contact 25 and hence to top limit relay coil R1 which is energized and closes the normally open contact C1R1. When the sync switch LS1, which is normally open, is closed by conveyor 12 of FIG. 1 the sync relay coil R3 is energized and closes the normally open contact C1R3. As a result thereof, the three contacts C1R3, C1R2 and C1R1 are all closed and the 117 volts A.C. are applied from contact 25 to the raise relay coil R4 which is then energized, closing contacts C1R4 and C2R4 so as to energize the time delay relay coil R14 which then closes contact C1R14 to enable energization of raise relay coil 28 which starts the hydraulic lift equipment by turning on the motor thereof. As a result thereof, the hydraulic equipment 7 will start lifting the lift device to the mid range where the operator 9 of FIG. 1 makes the measurement of the back fat thickness at the last rib on the fly when the green light 20 of FIG. 3 is turned on. The lift device will continue moving until the top limit switch is actuated to an open position which will then deenergize the previously energized relay coils. When the top limit switch LS2 is opened, the upper range switch LS4 is closed to energize the upper range relay coil R7 which together with the condition of its contacts and the contacts of lower range relay coil R8 will provide an indication of the position of the lift device for each of the measurements made.

Switches LS4 and LS5 with their associated contacts provide an indication of the position of the lift device. When the lower range switch LS5 is closed and the upper range switch is open, the lift device is in the lower range. When the switches LS4 and LS5 are both closed, the lift device is in the mid range. When the switch LS4 is closed and the switch LS5 is open, the lift device is in the upper range. As mentioned, the lift device does not stop in mid range and hence the operator measures the back fat thickness of the last rib on the fly.

The lift device position circuitry 30 has coupled thereto +12 volts D.C. and ground potential. The normally closed contacts C2R7 and C2R8 hold leads 31 and 32 at ground. When either or both switches LS4 and LS5 close, the relay coils R7 and/or R8 pull the normally open switches closed and the normally closed switches open, thus removing leads 31 and/or 32 from ground potential and applies +12 volts D.C. to either or both of these lines. Leads 31 and 32 thus have applied thereto ground on both leads, ground in one lead and +12 volts D.C. on the other lead or +12 volts D.C. on both leads. As a result, the lift device position is indicated on leads 31 and 32 by the ground and +12 volts D.C. potential combinations which is coupled to the interface and, hence, the computer. The normally closed contact C3R3 applies ground potential to lead 33 which provides an indication to the computer through its interface that the sync relay coil R3 has not been energized. When sync relay coil R3 is energized, contact C3R3 opens and contact C4R3 closes, applying the +12 volts D.C. to lead 33 which indicates to the computer that synchronization is present.

Before describing the lift device position circuitry 30, the description of the circuitry showed how the various relays caused the lift device to rise. The following description will indicate how the lift device is lowered from its top position to its lower position. The 117 volts A.C. is coupled to the normally closed bottom limit switch LS3 to contact 28 and hence to bottom limit relay coil R2 which is energized and closes the normally open contact C2R2. When the sync switch LS1 is closed by the conveyor 12, indicating the presence of a carcass in the proper position for measurement, contact C2R3 is closed thereby completing the circuit through the normally closed relay C2R1 to the lower relay coil R5 which is energized and causes the normally open contacts C1R5 and C2R5 to close and energize the time delay relay coil R15 which in turn closes the normally open contact C1R15 to energize the lower relay coil 29 which turns off the motor of the hydraulic lift equipment 7 and allows the lift device to fall at a steady pace to its lower position. When the lift device falls to its lower position, the bottom limit switch LS3 is opened and the previously energized relays are deenergized and the motion of the lift device is stopped. Of course, in this lower position the lower range switch LS5 is closed to activate the lower range relay coil R8 which controls its associated contacts as previously described.

The lower button 23 and the raise button 24 are override buttons. When the lower button 23 is depressed, normally closed contact 25 is open and normally open contact 26 is closed, thereby deenergizing raise relay coil 28 and energizing the lower relay coil 29 to turn off the motor in the hydraulic equipment 7. For a raise override, the raise button 24 is depressed and the normally open contact 27 is closed and the normally closed contact 28 is opened. This deenergizes the lower relay coil 29 and energizes the raise relay coil 28 which turns on the motor of the hydraulic equipment 7.

While I have described above the principles of my invention in connection with specific apparatus it is to be clearly understood that this description is made only by way of example and not as a limitation to the scope of my invention as set forth in the objects thereof and in the accompanying claims.

I claim:

1. An arrangement to measure the back fat thickness at three selected locations on animal carcasses conveyed on an overhead conveyor comprising:
   a hydraulically operated lift means to raise and lower
      a single operator to enable said operator to make measurements of said back fat thickness at said selected locations; and
   circuit means coupled to said lift means and synchronized to the movement of said conveyor to automatically control the movement of said lift means and to provide automatically an indication of the position of said lift means at which said operator is making each of said measurements.

2. An arrangement according to claim 1, wherein said lift means includes
   a platform upon which said operator stands, and
   a column on which said platform rides.

3. An arrangement according to claim 2, wherein said lift means further includes
   a control panel accessible to said operator.

4. An arrangement according to claim 3, wherein said control panel includes
   a red light which is lit during transition of said lift means between an upper and mid-ranges and mid and lower ranges,
   a green light which is lit when said lift means is in a proper position for said measurements,
   a raise button to override said circuit means to cause said lift means to raise until a top limit switch is tripped,
   a lower button to override said circuit means to cause said lift means to fall until a bottom limit switch is tripped, and
   start and stop buttons to control the operation of a hydraulic system which raises and lowers said lift means.

5. An arrangement according to claim 2, wherein said circuit means includes
   a normally closed top limit switch mounted in an appropriate position on said column actuated by a cam surface mounted on said platform,
   a normally closed bottom limit switch mounted in an appropriate position on said column actuated by said cam surface,
   a normally open upper range switch mounted in an appropriate position on said column actuated by said cam surface,
   a normally open lower range switch mounted in an appropriate position on said column actuated by said cam surface, and
   a normally open sync switch mounted adjacent said conveyor actuated by said conveyor to synchronize the raising and lowering of said lift means with the movement of said conveyor.

6. An arrangement according to claim 5, wherein said circuit means further including
   a first source of alternating current (A.C.) operating potential,
   an A.C. reference potential,
   said sync switch coupled to said first source,
   a sync relay coil coupled between said sync switch and said A.C. reference potential,
   said top limit switch coupled to said first source,
   a normally closed lower override switch coupled to said top limit switch,
   a normally open raise override switch coupled to said normally closed lower override switch,
   a first raise relay coil coupled between said normally open raise override switch and said A.C. reference potential to control hydraulic equipment of said lift means to cause said lift means to raise when said first raise relay coil is activated,
   a top limit relay coil coupled between said normally closed lower override switch and said A.C. reference potential,
   said bottom limit switch coupled to said first source,
   a normally closed raise override switch coupled to said bottom limit switch,
   a normally open lower override switch coupled to said normally closed raise override switch,
   a first lower relay coil coupled between said normally open lower override switch and said A.C. reference potential to control said hydraulic equipment to cause said lift means to lower when said first lower relay coil is activated, said normally closed lower override switch and said normally open lower override switch being mechanically interconnected, said normally open raise override switch and said normally closed raise override switch being mechanically interconnected, a bottom limit relay coil coupled between said normally closed raise override switch and said A.C. reference potential, a first normally open contact controlled by said sync relay coil coupled to said normally closed lower override switch, a first normally closed contact controlled by said bottom limit relay coil coupled to said first normally open contact, a second normally open contact controlled by said top limit relay coil coupled to said first normally closed contact, a second raise relay coil coupled between said second normally open contact and said A.C. reference potential, a third normally open contact controlled by said second raise relay coil coupled between said normally closed lower override switch and a junction between said first normally closed contact and said second normally open contact, a fourth normally open contact controlled by said second raise relay coil coupled to said third normally open contact, a first time delay relay coil coupled between said fourth normally open contact and said A.C. reference potential, a fifth normally open contact controlled by said sync relay coil coupled to said normally closed raise override switch, a second normally closed contact controlled by said top limit relay coil coupled to said fifth normally open contact, a sixth normally open contact controlled by said bottom limit relay coil coupled to said second normally closed contact, a second lower relay coil coupled between said sixth normally open contact and said A.C. reference potential, a seventh normally open contact controlled by said second lower relay coil coupled between said normally closed raise override switch and a junction between said second normally closed contact and said sixth normally open contact, an eighth normally open contact controlled by said second lower relay coil coupled to said seventh normally open contact, a second time delay relay coil coupled between said eighth normally open contact and said A.C. reference potential, a ninth normally open contact controlled by said first time delay relay coil connected in shunt relation to said normally open raise override switch, a tenth normally open contact controlled by said second time delay relay coil connected in shunt relation to said normally open lower override switch, said upper range switch being coupled to said first source, an upper range relay coil coupled between said upper range switch and said A.C. reference potential, said lower range switch being coupled to said first source, a lower range relay coil coupled between said lower range switch and said A.C. reference potential, a second source of direct current (D.C.) operating potential, a D.C. reference potential, a third normally closed contact controlled by said sync relay coil coupled to said D.C reference potential, an eleventh normally open contact controlled by said sync relay coil coupled between said third normally closed contact and said second source, a twelfth normally open contact controlled by said upper range relay coil coupled to said second source, a fourth normally closed contact controlled by said upper range relay coil coupled between said twelfth normally open contact and said D.C. reference potential, a fifth normally closed contact controlled by said lower range relay coil coupled to said D.C. reference potential, and a thirteenth normally open contact controlled by said lower range relay coil coupled between said fifth normally closed contact and said second source, said indication of the position of said lift means being derived from a junction between said fourth normally closed contact and said twelfth normally open contact and a junction between said fifth normally closed contact and said thirteenth normally open contact.

7. An arrangement according to claim 6, further including an indication of synchronization derived from a junction between said third normally closed contact and said eleventh normally open contact.

8. An arrangement according to claim 1, wherein said three locations include a first rib, a last rib and a last lumbar.

9. An arrangement according to claim 1, wherein said circuit means controls said lift means to move upward for every other one of said carcasses and to move downward for said carcasses intermediate said every other one of said carcasses.

* * * * *